United States Patent
Hwang

(10) Patent No.: US 10,525,933 B2
(45) Date of Patent: Jan. 7, 2020

(54) VEHICLE, TERMINAL DEVICE, AND METHOD FOR CONTROLLING VEHICLE

(71) Applicants: Hyundai Motor Company, Seoul (KR); Kia Motors Corporation, Seoul (KR)

(72) Inventor: Eon Du Hwang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 112 days.

(21) Appl. No.: 15/832,359

(22) Filed: Dec. 5, 2017

(65) Prior Publication Data

US 2019/0077368 A1 Mar. 14, 2019

(30) Foreign Application Priority Data

Sep. 13, 2017 (KR) .................. 10-2017-0116898

(51) Int. Cl.
*B60R 25/04* (2013.01)
*B60R 25/24* (2013.01)
(Continued)

(52) U.S. Cl.
CPC .............. *B60R 25/04* (2013.01); *B60R 25/24* (2013.01); *H04W 4/025* (2013.01); *H04W 4/04* (2013.01);
(Continued)

(58) Field of Classification Search
CPC ... B60R 25/04; B60R 25/24; B60R 2325/205; B60R 2325/101; H04W 4/80; H04W 4/025; H04W 4/04; H04W 12/06; H04L 67/12
See application file for complete search history.

(56) References Cited

U.S. PATENT DOCUMENTS 5,714,807 A * 2/1998 Albanes ............... B60R 25/06
                                                                    180/287
9,666,128 B2 * 5/2017 Jeong, II ............. G09G 3/3258
(Continued)

FOREIGN PATENT DOCUMENTS

JP        2012-221224 A      11/2012
JP        2013-258491      * 12/2013
(Continued)

*Primary Examiner* — Michael J Zanelli
(74) *Attorney, Agent, or Firm* — Mintz Levin Cohn Ferris Glovsky and Popeo, P.C.; Peter F. Corless

(57) ABSTRACT

A sharable vehicle is provided. The vehicle includes a storage that to stores registered user information and a communicator that communicates with a terminal device. A controller receives identification information of the terminal device from the terminal device when startup is performed. The controller unlocks a P stage of a transmission when it determined that the received identification information of the terminal device is the same as an identification number of the terminal device in the stored user information and locks a P stage of when it is determined that the received identification information of the terminal device is different from the identification number of the terminal device in the stored user information Additionally, the controller outputs authentication failure information of the terminal device and a display is configured to output the authentication failure information of the terminal device.

23 Claims, 9 Drawing Sheets

(51) Int. Cl.
    *H04W 12/06*    (2009.01)
    *H04W 4/02*    (2018.01)
    *H04L 29/08*    (2006.01)
    *H04W 4/80*    (2018.01)
    *H04W 4/04*    (2009.01)

(52) U.S. Cl.
    CPC ....... *H04W 12/06* (2013.01); *B60R 2325/101* (2013.01); *B60R 2325/205* (2013.01); *H04L 67/12* (2013.01); *H04W 4/80* (2018.02)

(56) References Cited

U.S. PATENT DOCUMENTS

| | | | |
|---|---|---|---|
| 9,845,071 B1 * | 12/2017 | Krishnan | B60R 25/24 |
| 2011/0086668 A1 * | 4/2011 | Patel | G08C 17/02 |
| | | | 455/556.1 |
| 2016/0185358 A1 * | 6/2016 | Todasco | B60W 50/12 |
| | | | 701/48 |
| 2016/0217635 A1 | 7/2016 | Pudar et al. | |

FOREIGN PATENT DOCUMENTS

| | | |
|---|---|---|
| JP | 2016-012369 A | 1/2016 |
| KR | 2016-0136989 A | 11/2016 |
| KR | 2017-0006768 A | 1/2017 |

\* cited by examiner

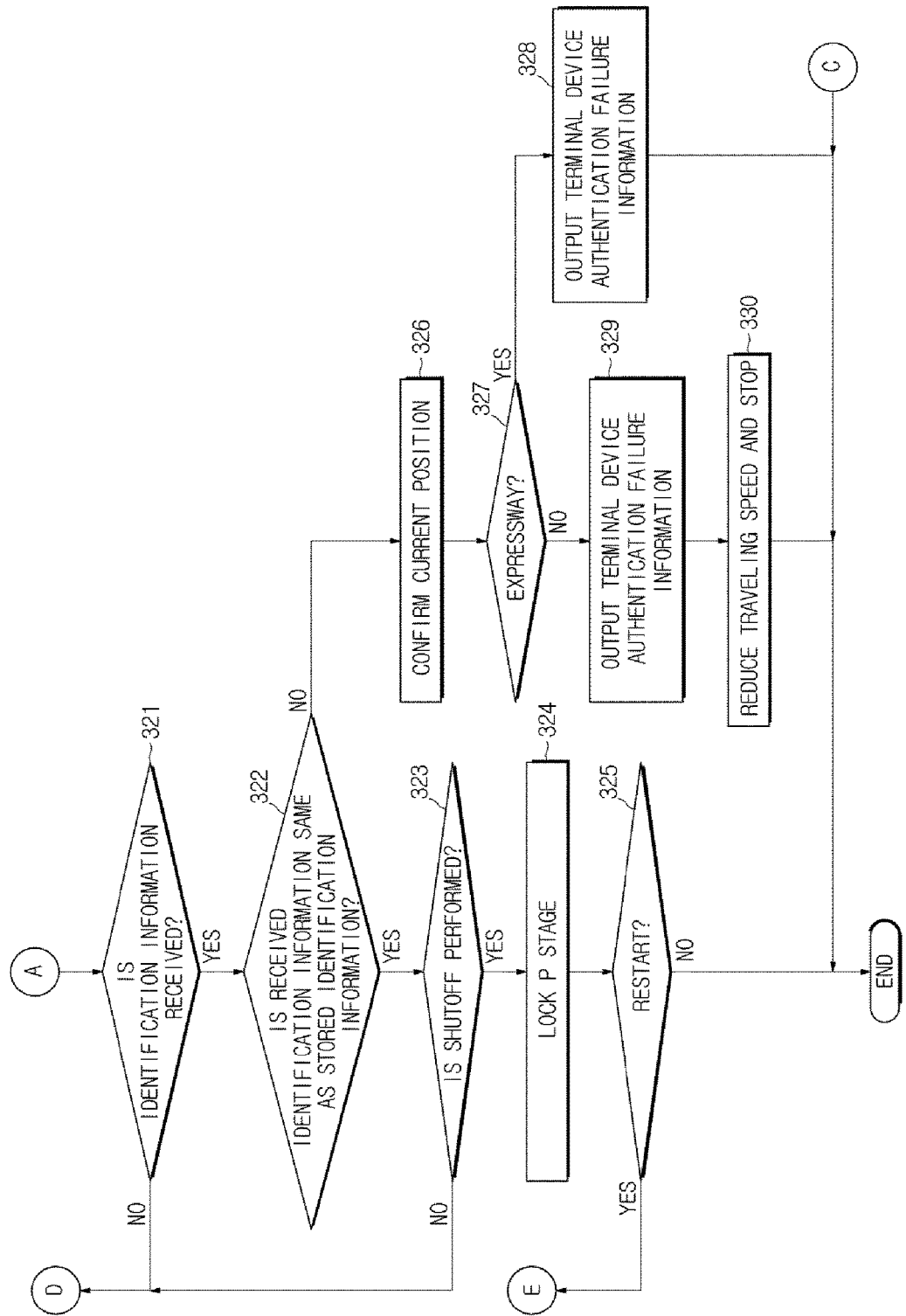

VEHICLE, TERMINAL DEVICE, AND METHOD FOR CONTROLLING VEHICLE

CROSS-REFERENCE TO RELATED APPLICATION

This application claims the benefit of Korean Patent Application No. 10-2017-0116898, filed on Sep. 13, 2017, the disclosure of which is incorporated herein by reference.

BACKGROUND

1. Field of the Disclosure

The present disclosure relates to a shareable vehicle configured to prevent unauthorized use of the vehicle, and more particularly, to sharable vehicle configured to prevent unauthorized use of the vehicle having a terminal device capable of communicating with the vehicle, and a method for controlling the vehicle.

2. Description of the Related Art

Generally, vehicles are machines configured to move on roads by driving wheels. Recently, with the introduction of car sharing systems, one vehicle is used by a plurality of people rather than by a single person. A car sharing system is a new concept of service which allows members in a car sharing group to freely use vehicles owned and is managed by corporations, public institutions, individuals, and the like.

Since the costs necessary for purchasing, maintaining, and managing vehicles and various associated tasks in a car sharing system are provided and performed through the corporate management system rather than by an individual driver, car sharing systems have recently become very popular in urban areas. In particular, a car sharing system includes a system in which a user performs registration with a car sharing company and uses a vehicle parked in a predetermined place using an electronic key input into an integrated circuit (IC) card or a terminal device, theft, unauthorized use, or the like of the vehicle is highly likely to occur.

SUMMARY

The present disclosure provides a vehicle configured to perform user authentication to prevent unauthorized use thereof at a time of performing car sharing, a terminal device capable of communicating with the vehicle, and a method for controlling the vehicle. The present disclosure provides a vehicle configured to operate P (park) stage locking of a transmission when it is determined that a vehicle is used in an unauthorized state when performing car sharing and a method for controlling the vehicle. and perform guidance to stop when it is determined that a vehicle is used in an unauthorized state when performing car sharing and a method for controlling the vehicle.

In an aspect of an exemplary embodiment of the present disclosure, a vehicle may include a storage configured to store registered user information, a communicator configured to communicate with a terminal device a controller configured to receive identification information of the terminal device from the terminal device when startup is performed, control P stage unlocking of a transmission when it is determined that the received identification information of the terminal device is the same as an identification number of the terminal device in the stored user information, control P stage locking of the transmission when it is determined that the received identification information of the terminal device is different from the identification number of the terminal device in the stored user information, and a display configured to output the authentication failure information of the terminal device.

In some exemplary embodiments, the controller of the vehicle may be configured to perform pairing with the terminal device when the startup is performed. The communicator of the vehicle may be configured to receive user information registered in an application (app) for car sharing from the terminal device. The identification information of the terminal device received by the vehicle may include a Wi-Fi media access control (MAC) address of the terminal device.

Additionally, the controller of the vehicle may be configured to transmit a provision request signal for the identification information of the terminal device to the terminal device at predetermined intervals when it is determined that the received identification information of the terminal device is the same as the identification number of the terminal device in the stored user information. The communicator of the vehicle may be configured to receive information regarding a current position and the controller may be configured to determine whether a road on which the vehicle is traveling is an expressway based on the received information regarding the current position when it is determined that the received identification information of the terminal device is different from the identification number of the terminal device in the stored user information and decrease a traveling speed when it is determined that the road on which the vehicle is traveling is not an expressway.

In other exemplary embodiments, the controller of the vehicle may be configured to decrease the traveling speed when it is determined that the road on which the vehicle is traveling is not an expressway and stop the vehicle to be stopped when a predetermined time has elapsed. The controller of the vehicle may be configured to operate an emergency light when it is determined that the road on which the vehicle is traveling is not an expressway. The controller of the vehicle may be configured to output the authentication failure information of the terminal device when it is determined that the road on which the vehicle is traveling is an expressway. The controller of the vehicle may be configured to perform pairing with the terminal device upon receiving a restart command after the startup is performed and configured to transmit a provision request signal for the identification information of the terminal device to the terminal device when it is determined that the pairing with the terminal device has been successfully performed.

In particular, the controller of the vehicle may be configured to delete the user information stored in the storage upon receiving return information through the communicator. The controller of the vehicle may be configured to delete other user information stored in the storage upon receiving new user information through the communicator. Additionally, the controller of the vehicle may be configured to confirm whether an unlocking signal is received from the communicator when it is determined that the received identification information of the terminal device is different from the identification information of the terminal device in the stored user information and release the P stage locking of the transmission when it is determined that the unlocking signal is received from the communicator.

In another aspect of an exemplary embodiment of the present disclosure, a terminal device may include a communicator configured to communicate with a vehicle, a storage configured to store an application for car sharing and identification information, an input configured to receive an execution command of the application, a controller configured to operate the application upon receiving the execution command of the application, to transmit user information registered in the application to the vehicle, and transmit the identification information and a display configured to display execution information of the application.

The input of the terminal device may be configured to receive a transmission command for identification information stored in the storage. The controller of the terminal device may be configured to transmit the identification information stored in the storage upon receiving a provision request signal for the identification information through the communicator. The controller of the terminal device may be configured to perform pairing with the vehicle upon receiving a pairing request signal through the communicator and transmit the identification information to the vehicle at predetermined intervals when it is determined that the pairing with the vehicle has been successfully performed.

The input of the terminal device may be configured to receive user information for registering a user in the application for car sharing and the controller may be configured to request the application to register the user based on the user information received by the input. The input of the terminal device may be configured to receive an information transmission command for an electronic key and the controller thereof may be configured to perform control transmission of the user information registered in the application to the vehicle when the startup of the vehicle is performed.

In accordance an aspect of an exemplary embodiment of the present disclosure, a method for controlling a vehicle communicating with a terminal device may include receiving, by the controller, identification information of the terminal device from the terminal device when startup is performed executing, by the controller, P stage unlocking of a transmission when it is determined that the received identification information of the terminal device is the same as an identification number of the terminal device in stored user information, executing, by the controller, P stage locking of the transmission when it is determined that the received identification information of the terminal device is different from the identification number of the terminal device in the stored user information and outputting, by the controller, authentication failure information of the terminal device.

The method for controlling the vehicle may further include performing, by the controller, pairing with the terminal device when the startup is performed, receiving, by the controller, user information registered in an application for car sharing from the terminal device when it is determined that the pairing has been completed and storing, by the controller, the received user information.

The method for controlling the vehicle may further include transmitting, by the controller, a provision request signal for the identification information of the terminal device to the terminal device at predetermined intervals when it is determined that the received identification information of the terminal device is the same as the identification number of the terminal device in the stored user information. The identification information of the terminal device may include a Wi-Fi MAC address of the terminal device.

The method for controlling the vehicle may further include confirming by a current position of the vehicle when it is determined that the received identification information of the terminal device is different from the identification number of the terminal device in the stored user information, determining, by the controller, whether a road on which the vehicle is traveling is an expressway based on the confirmed current position, outputting, by the controller, authentication failure information for the terminal device when it is determined that the road on which the vehicle is traveling is an expressway and adjusting, by the controller, a traveling speed to be reduced when it is determined that the road on which the vehicle is traveling is not an expressway and stopping, by the controller, the vehicle when a predetermined time has elapsed after the reducing of the traveling speed.

The method for controlling the vehicle may further include determining, by the controller, whether shutoff is performed and a restart command is received, and performing, by the controller, pairing with the terminal device upon receiving the restart command and transmitting a provision request signal for the identification information of the terminal device to the terminal device when it is determined that the pairing with the terminal device has been performed.

BRIEF DESCRIPTION OF THE DRAWINGS

These and other aspects of the disclosure will become apparent and more readily appreciated from the following description of the exemplary embodiments, taken in conjunction with the accompanying drawings of which:

FIGS. 6A and 6B are exemplary control flowcharts of the vehicle according to the exemplary embodiment of the present disclosure;

DETAILED DESCRIPTION

Figure 1:
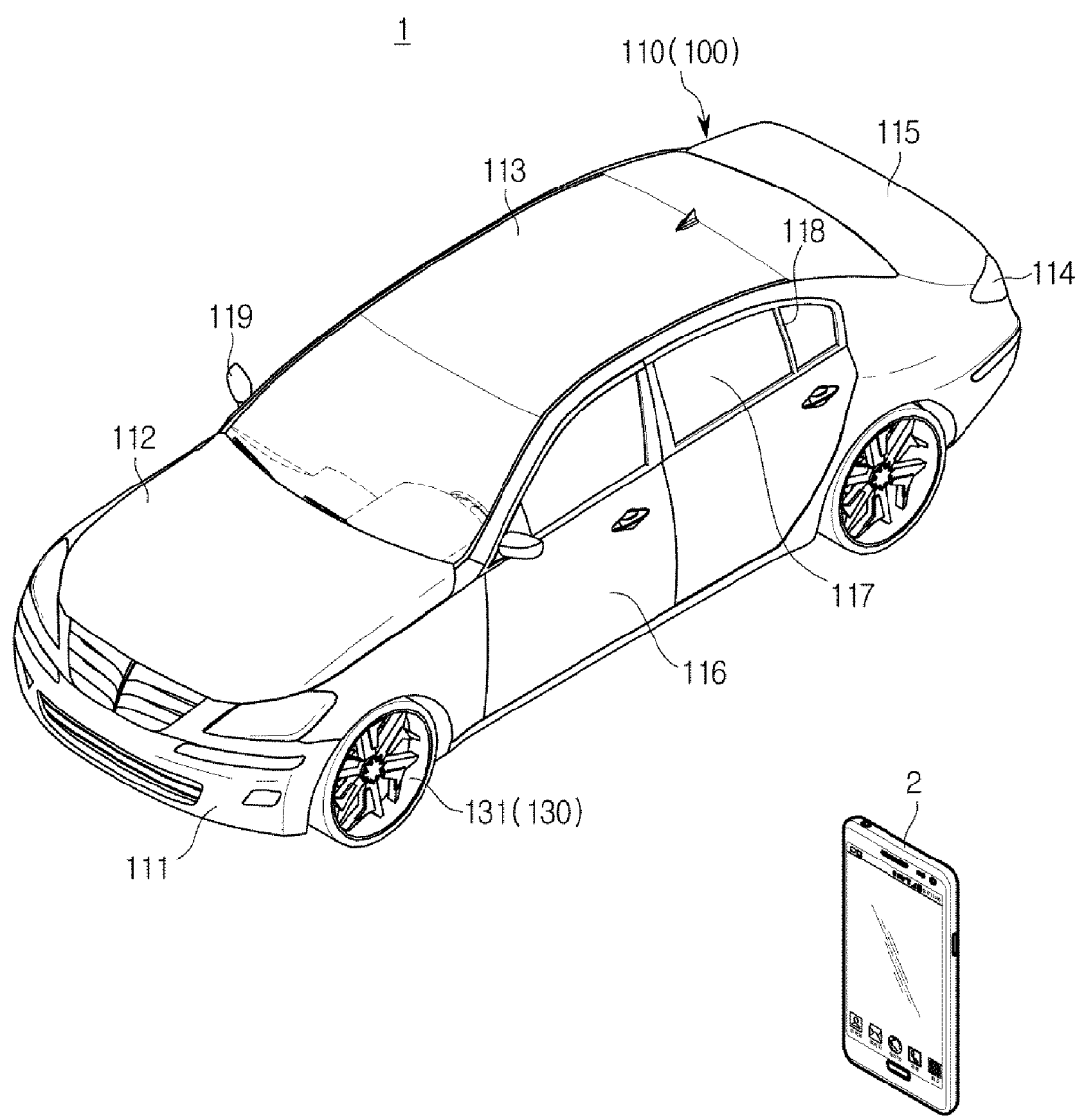
FIG. 1 is an exemplary diagram illustrating an external form of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about." Like reference numerals refer to like elements throughout the specification. This specification does not describe all elements of exemplary embodiments, and general content in the technical field to which the present disclosure belongs and repeated content between embodiments will be omitted. Throughout the specification, a case in which any part is "connected" to another part includes a case in which the part is directly connected as well as a case in which the part is indirectly connected. In addition, indirect connection includes connection through a wireless network.

Terms such as "first," "second," and the like are used to distinguish one constituent element from another, and constituent elements are not limited by such terms. The singular forms include the plural forms unless the context clearly indicates otherwise. Identification symbols in each step are used for convenience of explanation, the identification symbols do not describe the order of each step, and each step may be performed differently from the order specified unless explicitly stated in the context of the particular order.

The working principle and exemplary embodiments of the present disclosure will be described below with reference to the accompanying drawings. The present disclosure will be described in detail below with reference to the accompanying drawings.

Figure 2:
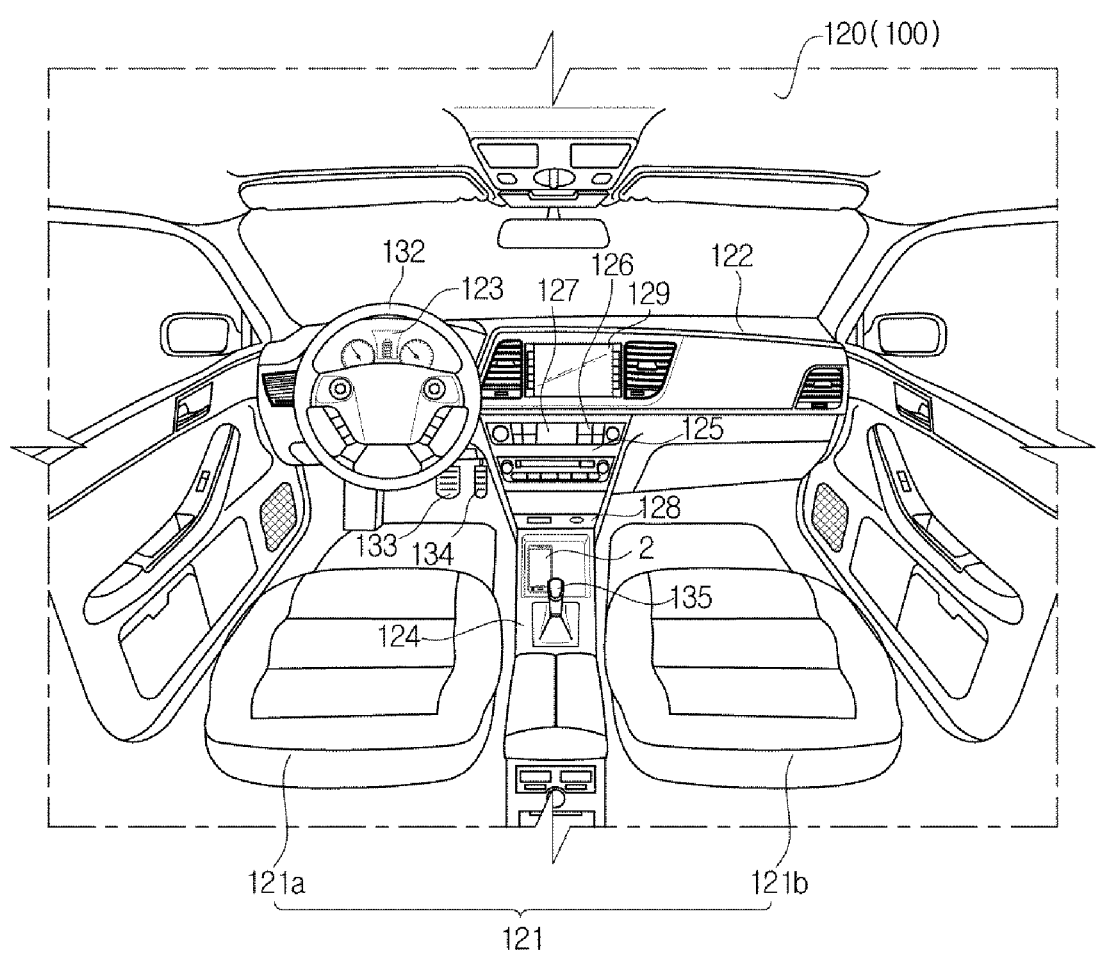
FIG. 2 is an exemplary diagram illustrating an inside of the vehicle according to the exemplary embodiment of the present disclosure.

FIG. 1 is an exemplary diagram illustrating an external form of a vehicle according to an exemplary embodiment. FIG. 2 is an exemplary diagram illustrating an interior of the vehicle according to the exemplary embodiment. The vehicle 1 may include a body 100 having an interior 110 and an exterior 120 and a chassis 130 forming the portions other than the body and in which mechanical devices required for traveling are installed. As shown in FIG. 1, an exterior 110 of the body 100 may include a front panel 111, a hood 112, a roof panel 113, a rear panel 114, a trunk 115, front and rear right and left doors 116, and window glasses 117 disposed in the front and rear right and left doors 116 to be openable and closable. Each of the doors 116 may include a locking member (not shown), and a locked state or an unlocked state of a door in the vehicle may be changed by remotely controlling a state of the locking member using an electronic key stored in a user terminal device 2. The exterior of the body may include the front panel, the hood, the roof panel, the rear panel, the truck, fillers 118 disposed between the window glasses of the front and rear right and left doors, and side mirrors 119 to provide a driver with rear fields of view of the vehicle 1.

As shown in FIG. 2, an interior 120 of the body 100 may include seats 121, a dashboard 122, an instrument panel (that is, a cluster 123) which is disposed above the dashboard and in which a tachometer, a speedometer, a coolant thermometer, a fuel meter, a turn signal indicator, a high beam indicator light, a warning light, a seat belt warning light, an odometer, a trechometer, an automatic shift selector lever indicator light, a door open warning light, an engine oil warning light, and a low fuel warning light are disposed, a center fascia 124 in which a vent and a control panel of an air conditioner and an audio device are disposed, and a head unit 125 provided in the center fascia 124 and configured to operate the audio device, the air conditioner, and a heater.

The seats 121 may be chairs for allowing the occupants to sit safely and comfortably within the vehicle. The seats 121 may be divided into a driver's seat 121a, a passenger's seat 121b, and a rear seat based on the arrangement. The center fascia 124 may include an input configured to receive inputs of an operation command and operation information. The head unit 125 may include an input 126 configured to receive an input of a function operation command and a display 127 configured to display operation information of various functions and information input by a user. The inputs provided in the center fascia and the head unit may be at least one of a jog dial type, a button type, and a touch pad type.

The vehicle may further include a multi-terminal 128 configured to perform wired communication with the user terminal device 2. The vehicle may include a user interface 129 configured to receive an input of an operation command from the user and output operation information. The user interface 129 may include a vehicle terminal device provided in the vehicle. The user interface 129 may be an audio, visual, and navigation (AVN) system configured to perform an audio function, a video function, and a navigation function. The user interface 129 may be provided as a touch screen obtained by integrating a touch panel and a display panel. The user interface 129 may include a display panel. Additionally, the user interface 129 may be disposed in the dashboard in a stationary manner or a buried manner.

The chassis 130 in the vehicle may be a frame configured to support the body and may include a plurality of wheels 131, a steering wheel 132 of a steering unit connected to an interior of the vehicle, a brake pedal 133 may be engaged by the user in accordance with the user's braking intention, an accelerator pedal 134 may be engaged by the user in accordance with the user's acceleration intention, and a shift lever 135 may be configured to operate a shift mode and the number of stages of a transmission (refer to FIGS. 1 and 2). The chassis 130 in the vehicle may further include a power unit, a brake, and a steering unit configured to apply a driving force, a braking force, and a steering force to front, rear, right, and left wheels and may further include a suspension, a transmission, and the like.

The vehicle may further include a startup button. The vehicle controls startup when the vehicle communicates with a terminal device and the startup button is turned on. For example, the communication with the terminal device may include confirming an electronic key stored in the terminal device 2. In particular, the vehicle may further include a communicator 140 (a first communicator in FIG. 3) configured to perform at least one of wired and wireless communication with the user terminal device 2. For example, the user terminal device 2 may be a computer or a portable terminal device capable of connecting to the vehicle over a network.

In particular, the computer may include, a notebook, a desktop, a laptop, a tablet personal computer (PC), a slate PC, and the like in which a web browser is installed, and the portable terminal device may include all types of handheld-based wireless communication devices such as a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband Internet (WiBro) terminal, a smartphone, and a wearable device such as a watch, a ring, a bracelet, an anklet, a necklace, glasses, contact lenses, or a head-mounted-device (HMD) as a wireless communication device with guaranteed portability and mobility.

The communicator 140 in the vehicle may include one or more constituent elements configured to enable communication with an external device and the terminal device 2, and may include a short-range communication module, a wired communication module, and a wireless communication module. The short-range communication module may include various short-range communication modules configured to transmit and receive a signal using a wireless network in a short distance, such as a Bluetooth module, an infrared communication module, a radio frequency identification (RFID) communication module, a wireless local access network (WLAN) communication module, a near field communication (NFC) communication module, and a Zigbee communication module.

The wired communication module may include various wired communication modules such as a controller area network (CAN) communication module, a local area network (LAN) module, a wide area network (WAN) module, or a value added network (VAN) module as well as various cable communication modules such as a universal serial bus (USB), a high definition multimedia interface (HDMI), a digital visual interface (DVI), a recommended standard 232 (RS-232), power line communication, or a plain old telephone service (POTS). The wireless communication module may include a wireless communication module configured to support various wireless communication types such as GSM, CDMA, wideband code division multiple access (WCDMA), universal mobile telecommunications system (UMTS), time division multiple access (TDMA), and long term evolution (LTE), in addition to a Wi-Fi module, and a wireless broadband (Wibro) module.

Figure 3:
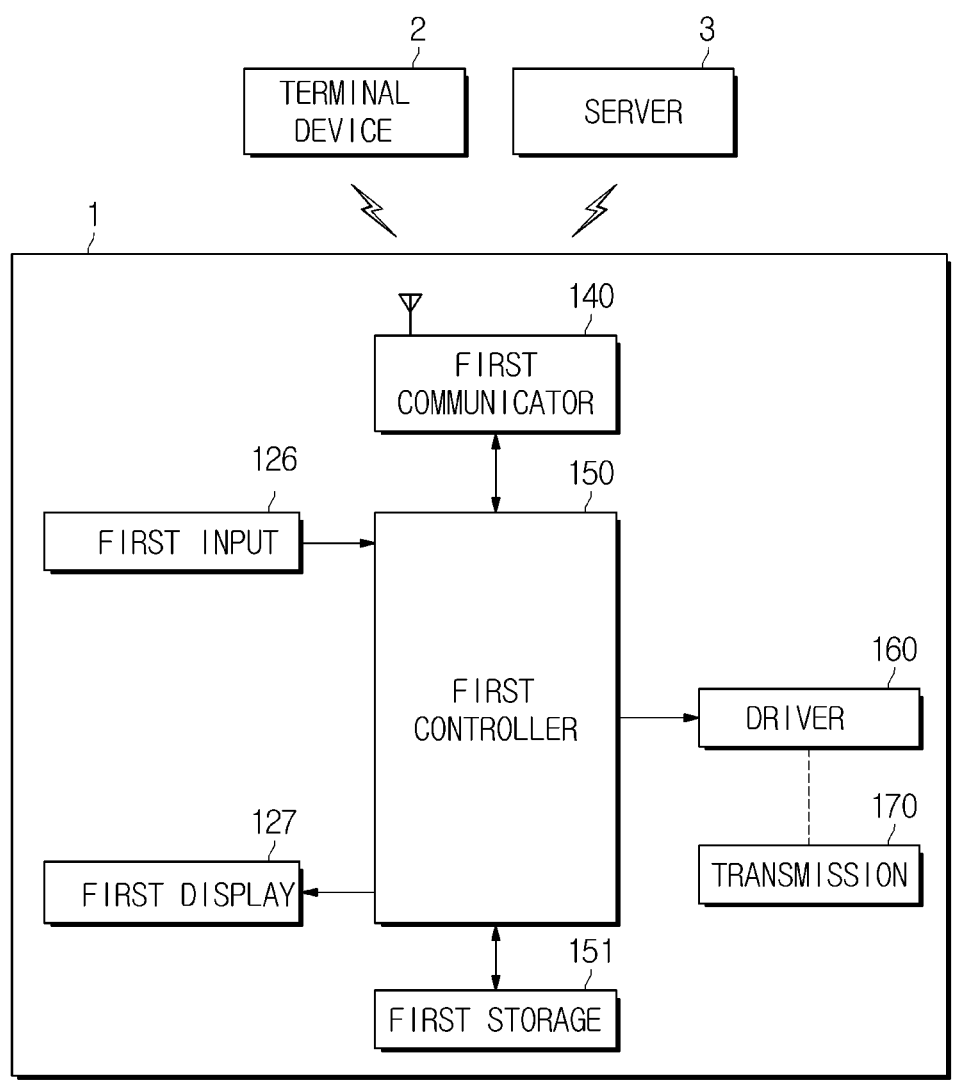
FIG. 3 is an exemplary control configuration diagram of the vehicle according to the embodiment of the present disclosure.
Figure 4:
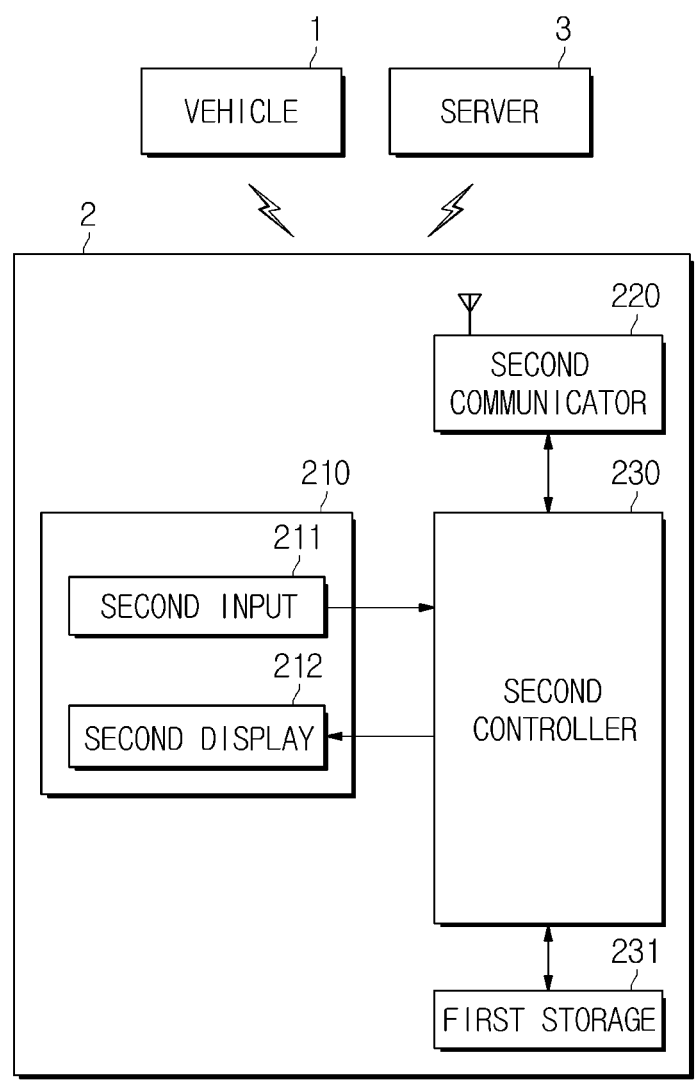
FIG. 4 is an exemplary control configuration diagram of a terminal device communicating with the vehicle according to the exemplary embodiment of the present disclosure.

FIG. 3 is an exemplary control configuration diagram of the vehicle 1 according to the exemplary embodiment. FIG. 4 is an exemplary control configuration diagram of the terminal device 2 communicating with the vehicle 1 according to the exemplary embodiment. In the exemplary embodiment, to distinguish between constituent parts of the vehicle 1 and constituent parts of the terminal device 2 which have the same name, "first" and "second" are assigned to the constituent parts of the vehicle and the constituent parts of the terminal device which have the same name, respectively. As shown in FIG. 3, the vehicle 1 may include a first input 126, a first display 127, a first communicator 140, a first controller 150, a first storage 151, a driver 160, and a transmission 170.

The first input 126 may be the input disposed in the head unit, the input provided in the center fascia, and an input of the user interface. The first input 126 may be configured to receive an input of a command for performing communication with the terminal device 2 to receive user information of the terminal device 2 and may be configured to receive an input of a pairing command with the terminal device 2. The first display 127 may be at least one of the display provided in the head unit, the display provided in the cluster, and the display of the user interface.

The first display 127 may be configured to display user information provision request information of the terminal device, display successful pairing and pairing failure information, and display successful authentication and authentication failure information of the terminal device 2. The first display 127 may be configured to display deceleration information of the vehicle when the authentication of the terminal device 2 fails. Additionally, the first display 127 may be configured to display stop information of the vehicle when the authentication of the terminal device 2 fails. The first display 127 may be configured to display status information of a P stage with respect to locking and unlocking of the P stage. The first display 127 may be configured to display a car sharing use time and a return location of the vehicle.

The first communicator 140 may be configured to communicate with the terminal device 2 and transmit and receive information to and from the terminal device through the communication with the terminal device 2. The first communicator 140 may be configured to receive information corresponding to an electronic key, pairing information, and identification information of the terminal device for authenticating the terminal device from the terminal device. Additionally, the first communicator 140 may be configured to transmit a pairing request signal based on a control command from the first controller 150, transmit a provision request signal for user information registered in an application, and transmit a provision request signal for identification information of the terminal device. The first communicator 140 may further include a global positioning system (GPS) receiver configured to receive signals from a plurality of satellites and recognize a current position on the basis of the received signals. The first communicator 140 may be configured to receive user information from a server 3.

For example, the server 3 may be a server of a car sharing company performing a car sharing business and a server configured to manage and supervise car sharing of all car sharing companies and manage and supervise registered members. The server 3 may be configured to store an application for car sharing and provide the stored application to users. The first communicator 140 may be configured to automatically receive user information from the server 3 when a current time is a reserved rental time. In addition, the first communicator 140 may be configured to automatically receive user information from the server 3 when startup is performed.

When the first controller 150 receives information corresponding to an electronic key from the terminal device 2, the first controller 150 may be configured to compare the received information on the electronic key with previously stored information on an electronic key. When the received information on the electronic key is the same as the previously stored information on the electronic key, the first controller 150 may be configured to unlock a door. When a start command is received, the information on the electronic key of the terminal device 2 may be confirmed. When the confirmed information of the electronic key is the same as the previously stored information on the electronic key, control may be performed to enable the startup. The first controller 150 may be configured to transmit a provision request signal for user information to the terminal device 2 and may be configured to store the storage of the received user information upon receiving the user information from the terminal device 2.

For example, the user information may include the user's name registered through the car sharing application, the user's home address, the user's email address, the user's identification number (e.g., a resident number or a date of birth), the user's card number or account number for performing payment for car sharing use, and driver's license information of the user and includes identification information of the user's terminal device. The identification information of the terminal device is unique identification information of a terminal device differentiated from those of other terminal devices, and may include at least one of a telephone number of the terminal device and a Wi-Fi media access control (MAC) address, a serial number, and an international mobile device identification code (IMEI) of the terminal device. The identification information of the terminal device may be Bluetooth identification information (BTID). Additionally, the user information provided from the terminal device 2 may be user information registered in an application for car sharing.

The first controller 150 may be configured to transmit a re-request signal used to request provision of the user information again to the terminal device when it is determined that user information is not received. The first controller 150 may be configured to determine whether there is previously stored user information and delete the previously stored user information when it is determined that there is the previously stored user information.

The first controller 150 may be configured to transmit a pairing request signal to the terminal device upon receiving user information and transmit a provision request signal for identification information of the terminal device to the terminal device 2 when the pairing with the terminal device is successfully performed. The first controller 150 may be configured to generate an authentication number upon receiving an input of a pairing command through the first input, to store the generated authentication number, and to display the stored authentication number on the display.

The first controller 150 may be configured to determine that the pairing with the terminal device has been successfully performed when it is determined that the stored authentication number is the same as an authentication number transmitted from the terminal device and determine that the pairing with the terminal device has failed when it is determined that the stored authentication number is different from an authentication number transmitted from the terminal device. The first controller 150 may be configured to transmit pairing success information to the terminal device when the pairing with the terminal device is successfully performed. The first controller 150 may be configured to maintain the locking state of the P stage of the shift lever when it is determined that the stored identification information of the terminal device is different from the received identification information of the terminal device and to display the difference information of the terminal device, that is, the authentication failure information of the terminal device, on the display.

The first controller 150 may be configured to recognize a risk of a road on which the vehicle is travelling, and when it is determined that the recognized risk of the road is equal to or higher than a predetermined risk, stop authentication for the terminal device during travelling, and when it is determined that the recognized risk of the road is lower than the predetermined risk and the road is a safe, resume the authentication for the terminal device.

The risk of the road may be variably determined depending on the type of the road, such as a public road, a national highway, a highway, and the like.

When the first controller 150 receives the identification information of the terminal device, the first controller 150 may be configured to compare the received identification information of the terminal device with the stored identification information of the terminal device, unlock the P stage of the shift lever when it is determined that the stored identification information of the terminal device is the same as the received identification information of the terminal device, and operate the power unit, the brake, and the steering unit based on operation information of the accelerator pedal, the brake pedal, the steering wheel, and the shift lever to enable the vehicle to travel in accordance with the user's intention.

The first controller 150 may be configured to transmit a provision request signal for identification information of the terminal device to the terminal device 2 at predetermined intervals during traveling. When the first controller 150 receives identification information of the terminal device from the terminal device 2, the first controller 150 may be configured to determine whether the received identification information of the terminal device is the same as the stored identification information of the terminal device and perform authentication on the terminal device when it is determined that the received identification information of the terminal device is the same as the stored identification information of the terminal device.

The first controller 150 may be configured to maintain the traveling by the user when it is determined that identification information of the terminal device received during traveling is the same as the stored identification information of the terminal device, to operate the display to display deceleration guidance or stop guidance information on the display when it is determined that the stored identification information of the terminal device is different from the received identification information of the terminal device, and to display authentication failure information of the terminal device on the display. The first controller 150 may be configured to automatically adjust the deceleration and to turn on an emergency light and may stop the vehicle to automatically when a predetermined time elapses when it is determined that the received identification information of the terminal device is different from the stored identification information of the terminal device.

The first controller 150 may be configured to operate the brake based on a traveling speed detected by a speed detector (not shown) to reduce a traveling speed. For example, the speed detector may include a plurality of wheel speed sensors provided in a plurality of wheels and may be configured to detect speeds of the wheels and may include an acceleration sensor configured to detect the acceleration of the vehicle. The first controller 150 may be configured to determine whether a current position received by the GPS receiver is an expressway based on the current position when it is determined that the stored identification information of the terminal device is different from the received identification information of the terminal device, and to display authentication failure information of the terminal device on the display when it is determined that the current position is an expressway.

The first controller 150 may be configured to transmit a pairing request signal to the terminal device upon receiving a restart command and unlock the P state unlocking and traveling by comparing the received identification information of the terminal device with the stored identification information of the terminal device when it is determined that the pairing with the terminal device is successfully performed. The first controller 150 may be configured to delete the stored user information upon receiving vehicle return information through an application of the terminal device. The first controller 150 may be configured to transmit information regarding unauthorized use of the vehicle to the server 3 when it is determined that the received identification information of the terminal device is different from the stored identification information of the terminal device.

The first controller 150 may be configured to determine whether an unlocking signal is received from the communicator when it is determined that the received identification information of the terminal device is different from identification information of the terminal device among stored user information, and releases P stage locking of the transmission when it is determined that the unlocking signal is received. For example, an unlocking signal received by the communicator may be a signal transmitted from the server.

As described above, when the driver loses the terminal device, loss authentication for the terminal device may be performed through the server. When the loss authentication for the terminal device is completed, the P stage locking of the transmission may be released to enable the user to operate the vehicle.

The performing of loss authentication for the terminal device may include speech recognition, fingerprint recognition, iris recognition, and using a terminal device of a second user as an authenticating terminal.

The second user may be a person having a close relationship with the user, such as a family member, a friend, and the like.

The first controller 150 may be an algorithm configured to control operations of constituent elements in the vehicle, or a memory (not shown) configured to store data on a program configured to reproduce the algorithm, and a processor (not shown) configured to perform the above operations using the data stored in the memory. In particular, the memory and the processor may each be realized as separate chips. Alternatively, the memory and the processor may be realized as a single chip.

The first storage 151 may be configured to store user information on car sharing. The user information may include the user's name registered through the car sharing application, the user's home address, the user's email address, the user's identification number (e.g., a resident number and a date of birth), the user's card number or account number for performing payment for car sharing use, and driver's license information of the user and includes identification information of the user's terminal device. The identification information of the terminal device may be a unique identification information of the terminal device differentiated from those of other terminal devices, and may include at least one of a telephone number of the terminal device and a Wi-Fi MAC address, a serial number, and an IMEI of the terminal device.

The first storage 151 may be at least one of a nonvolatile memory device such as a cache, a read only memory (ROM), a programmable ROM (PROM), an erasable PROM (EPROM), an electrically erasable PROM (EEPROM), and a flash memory, a volatile memory device such as a random access memory (RAM), and storage media such as a hard disk drive (HDD) and a compact disc (CD)-ROM, but the present disclosure is not limited thereto. The first storage 151 may be a memory that may include as a chip separate from the processor described above in relation to the first controller 150 and may be realized as a single chip with the processor. The driver 160 may operate the transmission 170 based on a control command of the first controller 150. In particular, the driver 160 causes the P stage of the shift lever to be locked or the P stage to be unlocked.

The transmission 170 may adjust the number of stages through an operation of the shift lever 135. The shift lever 135 may be configured to include P, (park) R (reverse), N (neutral), D (drive), first, and second stages. The parking (P) stage may allow the transmission to be locked to prevent the shift lever of the vehicle from being moved to a stage when the shift lever is located when the vehicle is parked or started. The reverse (R) stage may be a stage when the shift lever is located when the vehicle is moved rearward, the neutral (N) stage is a stage at which a gear of the transmission is in a neutral state in which the gear thereof is not engaged, and the drive (D) stage is a stage at which the shift lever is located when the vehicle travels.

The second stage may be used when the user intends to use an engine brake when the vehicle travels on a slippery road and travels up or down a hill, and the first stage may be used when the user intends to use an engine brake when the vehicle travels up a very steep hill or a speed of the vehicle is low. At least one constituent element may be added or deleted to correspond to the performance of the constituent elements of the vehicle shown in FIG. 1. Furthermore, it will be readily understood by those skilled in the art that the mutual positions of the constituent elements can be changed to correspond to the performance or structure of the system. Additionally, the constituent elements shown in FIG. 3 refer to software and/or hardware constituent elements such as a field programmable gate array (FPGA) and an application specific integrated circuit (ASIC).

As shown in FIG. 4, the terminal device 2 may include a second user interface 210, a second communicator 220, a second controller 230, and a second storage 231. The second user interface 210 may be configured to receive an operation command and operation information from the user and displays performance information of a function being performed. The second user interface 210 may include a second input 211 and a second display 212. The second user interface 210 may be a touch screen obtained by integrating a touch panel serving as the second input 211 and a display panel serving as the second display 212. The second input 211 of the second user interface 210 may further include at least one button.

The second input 211 may be configured to receive an input of a download command of an application for car sharing and receive an input of an execution command of the downloaded application. The second input 211 may be configured to receive an input of a retrieval command of identification information of the terminal device and receive inputs of user information and the identification information of the terminal device when the user information is registered in the application. The second input 211 may be configured to receive an input of an information transmission command of an electronic key of the application. In other words, an electronic key button of the application may be selected and return information of the vehicle may be selected through the application. The second display 212 may be configured to display execution information of the car sharing application and display pairing information regarding pairing with the vehicle, successful pairing, and pairing failure, successful authentication and authentication failure information with the vehicle, or the like.

The second communicator 220 may be configured to communicate with the vehicle and communicate with the server. The second communicator 220 may perform wired and wireless communication. The second communicator 220 may be configured to receive a pairing request signal from the vehicle and receives user information and identification information provision request information of the terminal device from the vehicle. Further, the second communicator 220 may be configured to transmit reservation information on car sharing input to the application to the server 3. The second communicator 220 may be configured to receive information corresponding to an electronic key from the server 3, transmit the information corresponding to the electronic key to the vehicle 1, transmit pairing information and user information to the vehicle 1, and transmit identification information of the terminal device for authentication of the terminal device to the vehicle 1.

The second controller 230 may be configured to operate the execution of the application upon receiving an application execution command, perform control to display a membership subscription window in which user information may be input upon receiving a membership joining command, and transmit user information input to the second input 211 to the server 3. When the second controller 230 receives a retrieval command of identification information of the terminal device at the time of inputting user information to the application, the second controller 230 may be configured to retrieve the identification information of the terminal device and may operate the display of the retrieved identification information of the terminal device.

The second controller 230 may be configured to enable the server 3 to transmit the reservation information of the car sharing input through the application, and upon receiving information on the electronic key from the server 3, store the received information of the electronic key. When an electronic key on the application is selected, the second controller 230 may be configured to operate the second communicator 220 to output information of the electronic key. The second controller 230 may be configured to transmit pairing information for pairing with the vehicle to the vehicle upon receiving a pairing request signal. In other words, the second controller 230 may be configured to transmit an authentication number input to the second input 211 to the vehicle 1 at the time of pairing with the vehicle. At this time, the vehicle 1 determines that the pairing has been successfully performed when it is determined that the stored authentication number is the same as the received authentication number.

In particular, the authentication number may be information generated and stored in the vehicle when a pairing command is input to the vehicle and displayed on a first display. The second controller 230 may be configured to operate the second communicator 220 to transmit user information registered in the application to the vehicle upon receiving a provision request signal for user information from the vehicle. The second controller 230 may be configured to operate the second communicator 220 to transmit the identification information of the terminal device to the vehicle upon receiving a provision request signal for the identification information of the terminal device from the traveling vehicle.

Additionally, the second controller 230 may be configured to operate the second communicator 220 to automatically transmit the identification information of the terminal device to the vehicle at predetermined intervals. The second controller 230 may be configured to transmit information on unauthorized use of the vehicle to the server 3 upon receiving authentication failure information of the terminal device from the vehicle. When the second controller 230 receives vehicle return information through the application, the second controller 230 may be configured to transmit the received vehicle return information to the server 3 or the vehicle 1.

The second controller 230 may be an algorithm configured to control operations of constituent elements in the terminal device, or a memory (not shown) configured to store data on a program configured to reproduce the algorithm, and a processor (not shown) configured to perform the above operations using the data stored in the memory. In particular, the memory and the processor may each be separate chips. Alternatively, the memory and the processor may be a single chip.

Additionally, the second storage 231 may be configured to store the identification information of the terminal device. The second storage 231 may be configured to store the application for car sharing. In particular, second storage 231 may be configured to store identification information of the paired vehicle. When the second storage 231 receives information on the electronic key from the server 3, the second storage 231 may be configured to store the received information on the electronic key. The second storage 231 may be at least one of a nonvolatile memory device such as a cache, a ROM, a PROM, an EPROM, an EEPROM, and a flash memory, a volatile memory device such as a RAM, and storage media such as an HDD and a CD-ROM, but the present disclosure is not limited thereto. The second storage 231 may be a memory a chip separate from the processor described above in relation to the second controller 230 and may be a single chip with the processor.

Figure 5:
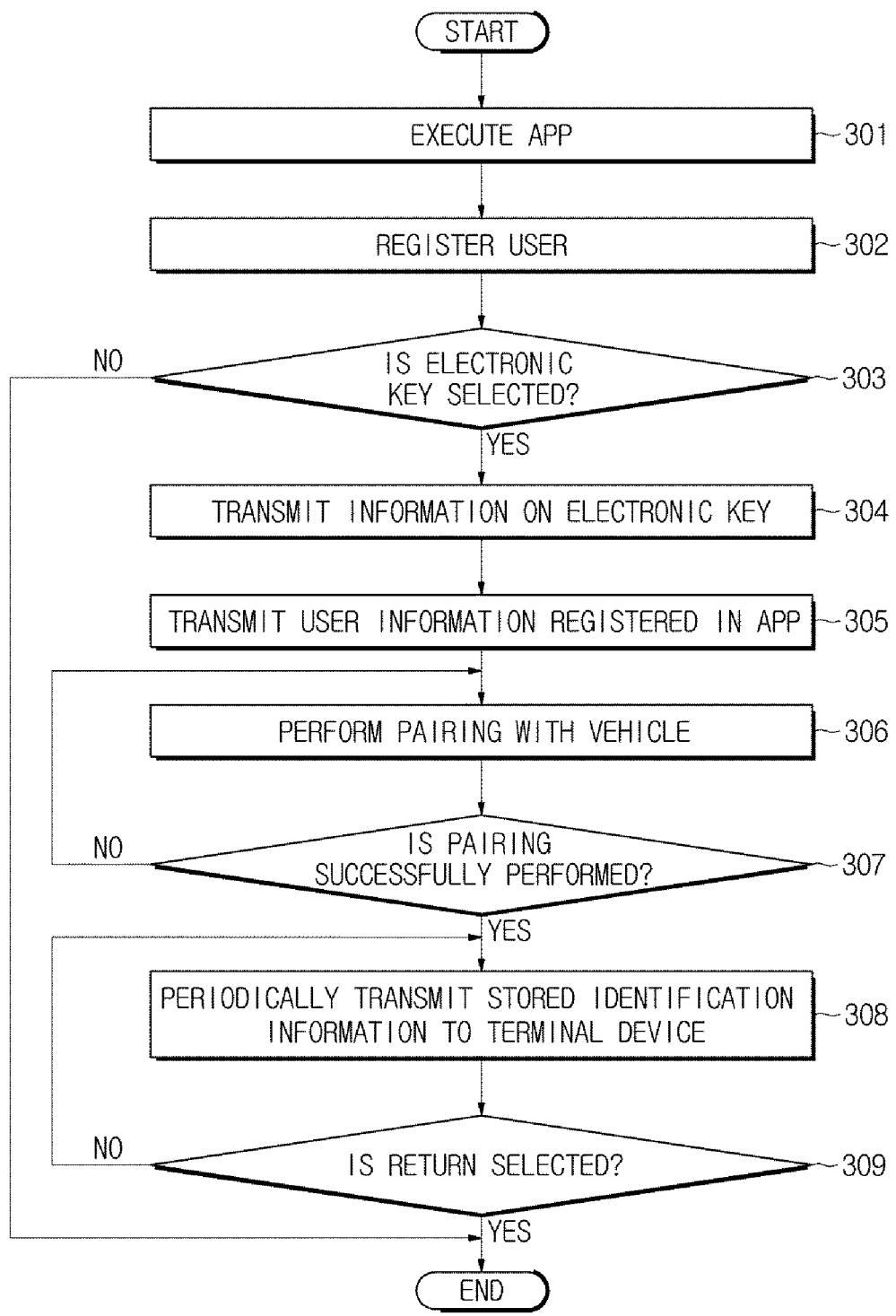
FIG. 5 is an exemplary control flowchart of a terminal device communicating with the vehicle according to the exemplary embodiment of the present disclosure.

FIG. 5 is an exemplary control flowchart of the terminal device communicating with the vehicle according to the exemplary embodiment. The terminal device may be configured to execute the application for car sharing (301) when the user selects the application and display execution information of the application on a second display. The terminal device may be configured to request the user to obtain membership when the user is not a member of the application.

The terminal device displays a membership subscription window on a second display upon receiving a membership joining command through the second input, and when the terminal device receives inputs of user information corresponding to display information of the second display and the identification information of the terminal device through the second input, transmit the input user information and the identification information of the terminal device to the server 3. This allows the user to be registered as a member for car sharing (302). The terminal device may be configured to execute the application, receive an input of reservation information through the application, and upon receiving an input of a reservation completion command, transmit the input reservation information to the server 3.

When the user executes the application and an electronic key of the application is selected (303), the terminal device may be configured to transmit information of the electronic key to the vehicle (304) to enable a door of the vehicle to be unlocked and the vehicle may be started. At this time, the terminal device may be configured to display a guidance message for an on operation of the user interface 129 provided in the vehicle. The terminal device may be configured to transmit the user information registered in the application to the vehicle (305) when receiving an input of a user information transmission command of the application. For example, the user information may include the driver's license information of the user, payment information, and identification information of the terminal device of the user.

Additionally, the terminal device may be configured to transmit the user information registered in the application to the vehicle by displaying a guidance message. Moreover, the terminal device may be configured to automatically transmit the user information registered in the application to the vehicle upon receiving a provision request signal for the user information registered in the application from the vehicle. The terminal device may be configured to perform pairing with the vehicle (306) upon receiving a pairing request signal from the vehicle and transmit identification information of the terminal device stored at predetermined intervals to the vehicle (308) when the pairing with the vehicle has been successfully performed (307).

The terminal device may be configured to display an input request message of an authentication number upon receiving a pairing request signal from the vehicle. In addition, when the user inputs the authentication number, the terminal device may be configured to transmit the input authentication number to the vehicle, and then the terminal device may be configured to determine that the pairing with the vehicle has been successfully performed upon receiving a signal indicating successful pairing from the vehicle and may be configured to determine that the pairing with the vehicle has failed upon receiving a signal indicating pairing failure.

The terminal device may be configured to determine whether return is selected through the application (309) and transmit the identification information of the terminal device to the vehicle at predetermined intervals until return is selected through the application. For example, the return selection may include selecting a return button in the application. In addition, the terminal device may be configured to transmit the identification information of the terminal device to the vehicle upon receiving a provision request signal for the identification information of the terminal device from the vehicle.

Figure 6A:
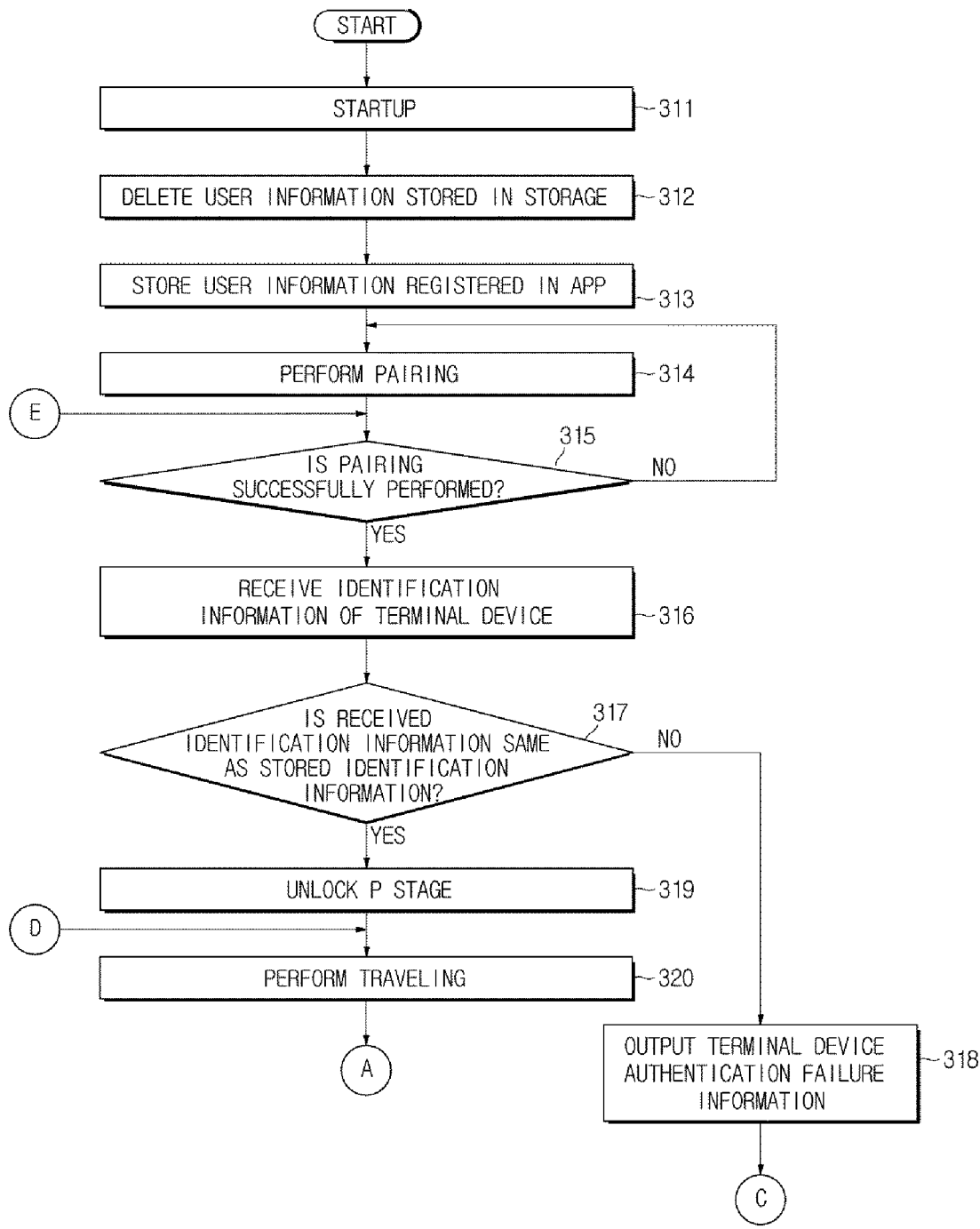

FIGS. 6A and 6B are exemplary control flowcharts of the vehicle according to the exemplary embodiment. When the vehicle receives information on an electronic key from the terminal device 2, the vehicle may be configured to compare the received information on the electronic key with previously stored information on an electronic key, unlock a door when it is determined that the received information on the electronic key is the same as the previously stored information on the electronic key, confirms the information of the electronic key of the terminal device 2 upon receiving a start command, and may be turned on (311) when it is determined that the confirmed information on the electronic key is the same as the previously stored information on the electronic key.

When the vehicle is turned on, user information stored in a storage may be deleted (312). For example, the user information stored in the storage of the vehicle may be user information of the user. The vehicle may be configured to receive user information registered in the application transmitted through the terminal device and store the received user information (313). The vehicle may be configured to transmit a provision request signal for the user information to the terminal device when it is determined that the user information is not received.

In particular, the user information may include the user's name registered through the car sharing application, the user's home address, the user's email address, the user's identification number (for example, a resident number or a date of birth), the user's card number or account number for performing payment for car sharing use, and driver's license information of the user and includes identification information of the user's terminal device. The identification information of the terminal device may be unique identification information of the terminal device differentiated from those of other terminal devices, and includes at least one of a telephone number of the terminal device and a Wi-Fi MAC address, a serial number, and an IMEI of the terminal device. The vehicle may be configured to perform pairing with the terminal device (314) upon receiving a pairing command input through the input.

In particular, the vehicle may be configured to generate an authentication number upon receiving the pairing command, store the generated authentication number, displays the stored authentication number, and transmits a pairing request signal to the terminal device. Subsequently, when the vehicle receives an authentication number from the terminal device, the vehicle may be configured to compare the received authentication number with a stored authentication number, determine that the pairing with the terminal device has been successfully performed when it is determined that the received authentication number is the same as the stored authentication number, and determine that the pairing with the terminal device has failed when it is determined that the stored authentication number is different from the received authentication number.

The vehicle may be configured to regenerate an authentication number when it is determined that the pairing with the terminal device has failed, store and display the regenerated authentication number, and retransmit a pairing request signal to the terminal device. In addition, the vehicle may be configured to transmit pairing success information to the terminal device when it is determined that the pairing with the terminal device has been successfully performed. The vehicle may be configured to transmit a provision request signal for the identification information of the terminal device to the terminal device 2 when it is determined that the pairing with the terminal device has been successfully performed (315).

The vehicle may be configured to confirm terminal device identification information in user information stored in the first storage, receive the identification information of the terminal device transmitted from the terminal device (316), and determine whether the received identification information of the terminal device is the same as stored identification information of the terminal device (317). The vehicle may be configured to determine that the authentication of the terminal device has failed when it is determined that the received identification information of the terminal device is different from the stored identification information of the terminal device, maintain the locking of the P stage of the shift lever, and output the authentication failure information of the terminal device on the first display (318). In other words, the vehicle may be configured to output the authentication failure information of the terminal device on the first display, thereby allowing the user to recognize unauthorized use of the vehicle.

The vehicle may be configured to unlock the P stage of the shift lever (319) when it is determined that the received identification information of the terminal device is the same as the stored identification information of the terminal device and travels on the basis of the user's operation (320). In other words, the vehicle may travel in accordance with the user's intention by operating the power unit, the brake, and the steering unit based on operation information of the accelerator pedal, the brake pedal, the steering wheel, and the shift lever.

The vehicle may be configured to transmit the provision request signal of the identification information of the terminal device to the terminal device 2 at predetermined intervals periodically, during traveling. In addition, when vehicle receives the identification information of the terminal device from the terminal device 2 (321), the vehicle may be configured to determine whether the received identification information of the terminal device is the same as the stored identification information of the terminal device (322), maintain the traveling by the user when it is determined that the received identification information of the terminal device is the same as the stored identification information of the terminal device, and the locking of the P stage is controlled (324) and a request for providing the identification information of the terminal device is stopped when a shutoff command is received (323).

The vehicle may be configured to repeatedly perform a process of performing pairing with the terminal device and a process of periodically performing authentication with the terminal device upon receiving a restart command due to startup (325). The vehicle may be configured to confirm a current position received by the GPS receiver (326) when it is determined that received identification information of the terminal device is different from stored identification information of the terminal device when transmitting a provision request signal for the identification information of the terminal device periodically during traveling, determine whether a road in which the vehicle is currently located is an expressway based on the confirmed current position (327), and display authentication failure information of the terminal device on the first display when it is determined that the road in which the vehicle is currently located is an expressway. This may allow the user to recognize unauthorized use of the vehicle.

The vehicle may be configured to display the authentication failure information of the terminal device on the first display (329) when it is determined that the current position is not an expressway, reduce traveling speed, and may be stopped after a predetermined time (330). Furthermore, the vehicle may be configured to turn on an emergency light while decelerating and stopping. In addition, the vehicle may be configured to output traveling stop information on the display after a predetermined time to enable the user to recognize the stop of the vehicle. Reducing a traveling speed of the vehicle may include reducing a speed of the vehicle by operating the brake based on a traveling speed detected by the speed detector. The vehicle may delete stored user information upon receiving vehicle return information through the application of the terminal device. In addition, the vehicle may be configured to transmit information on unauthorized use of the vehicle to the server 3 when it is determined that the received identification information of the terminal device is different from the stored identification information of the terminal device.

In addition, the vehicle may be configured to perform user authentication (for the first user) by using speech recognition, fingerprint recognition, iris recognition, and recognition of authentication for a terminal device of a second user, and when the user authentication is completed, unlock the P stage locking.

Figure 7:
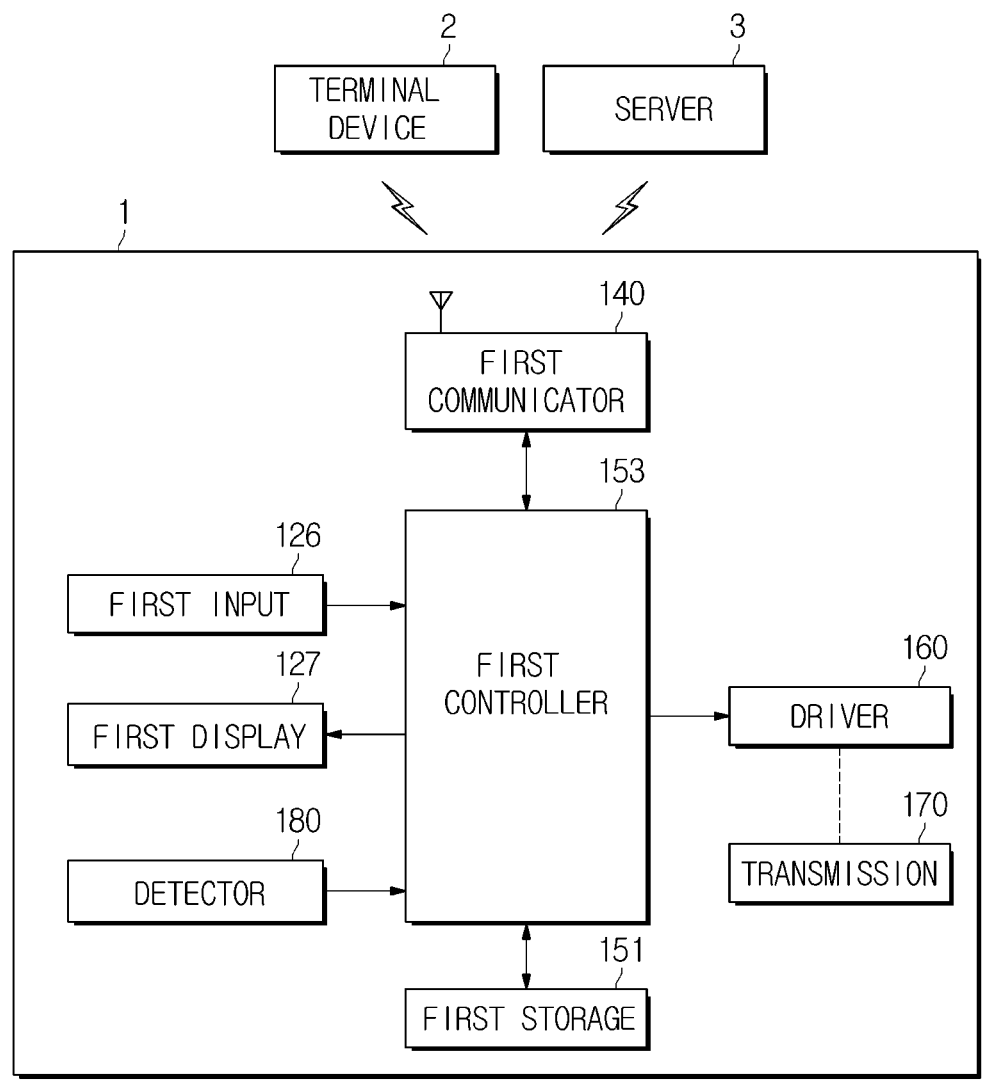
FIG. 7 is an exemplary control configuration diagram of a vehicle according to another exemplary embodiment of the present disclosure.

FIG. 7 is an exemplary control configuration diagram of a vehicle according to an exemplary embodiment, and the vehicle may include a first input 126, a first display 127, a first communicator 140, a first controller 153, a first storage 151, a driver 160, a transmission 170, and a detector 180. The vehicle according to the exemplary embodiment may be configured to communicate with a user terminal device 2 and communicate with a server 3. Since configurations of the terminal device 2 and the server 3 are the same as those of the above-described exemplary embodiment, description thereof will be omitted.

Since the first input 126, the first display 127, the first communicator 140, the first storage 151, and the driver 160 according to the exemplary embodiment are the same as those of the embodiment of FIG. 3, description thereof will be omitted. The detector 180 may include a speed detector configured to detect a traveling speed of the vehicle. The speed detector may include a plurality of wheel speed sensors disposed in a plurality of wheels and may be configured to detect speeds of the wheels and may include an acceleration sensor configured to detect the acceleration of the vehicle.

The detector 180 may include a boarding detector disposed in a seat 121 and may be configured to detect boarding information of a driver or a passenger. For example, the boarding detector may be an attachment and detachment detector configured to detect attaching and detaching of a seat belt or a weight detector configured to detect a weight of an occupant.

A configuration of the first controller 153 which is the same as that of the first controller 150 of FIG. 3 will be briefly described. When the first controller 153 may be configured to receive information corresponding to an electronic key from the terminal device 2, the first controller 153 may be configured to unlock of a door and starting of the vehicle based on the received information on the electronic key. The first controller 153 may be configured to transmit a provision request signal for user information registered in an application to the terminal device 2. In addition, when the first controller 153 receives the user information registered in the application from the terminal device 2, the first controller 153 to store the received user information. In addition, the first controller 153 may be configured to receive the user information registered in the application from the server 3.

The user information may include the user's name registered through the car sharing application, the user's home address, the user's email address, the user's identification number (for example, a resident number or a date of birth), the user's card number or account number for performing payment for car sharing use, and driver's license information of the user and includes identification information of the user's terminal device. The identification information of the terminal device may be unique identification information of the terminal device differentiated from those of other terminal devices, and includes at least one of a telephone number of the terminal device and a Wi-Fi MAC address, a serial number, and an IMEI of the terminal device.

The first controller 153 may be configured to perform pairing with the terminal device upon receiving the user information and transmit a provision request signal for the identification information of the terminal device to the terminal device 2 when it is determined that the pairing with the terminal device has been successfully performed. The first controller 153 may be configured to lock a P stage of a shift lever and to display difference information of the terminal device (e.g., authentication failure information of the terminal device) on the first display when it is determined that the identification information of the terminal device stored in the first storage is different from the received identification information of the terminal device.

The first controller 153 may be configured to unlock the P stage and display same information of the terminal device, (e.g., authentication success information of the terminal device) on the first display when it is determined that the identification information of the terminal device stored in the first storage is the same as the identification information of the terminal device received from the terminal device. The first controller 153 may be configured to determine whether the vehicle is parked or stopped based on detection information detected by the detector 180 while the vehicle is traveling. In other words, the first controller 153 may be configured to determine whether the vehicle is stopped based on the traveling speed detected by the detector 180 and may be configured to determine whether the vehicle is parked based on operation information of the shift lever.

The first controller 153 may be configured to transmit a provision request signal for the identification information of the terminal device when it is determined that the vehicle is parked or stopped. In addition, when the first controller 153 receives the identification information of the terminal device from the terminal device 2, the first controller 153 may be configured to determine whether the received identification information of the terminal device is the same as the identification information of the terminal device stored in the first storage and performs authentication on the terminal device.

In addition, the first controller 153 may be configured to transmit the provision request signal of the identification information of the terminal device to the terminal device when it is determined that an elapsed time of a parked state or a stopped state of the vehicle is a reference time or more. For example, the reference time may be a time at which another person may board the driver's seat after an occupant of the driver's seat leaves.

The first controller 153 may be configured to transmit a provision request signal for the identification information of the terminal device to be periodically transmitted to the terminal device 2 when a predetermined time elapses from a parked state or a stopped state and output information on the failed recognition of the terminal device in the vehicle to be output when the identification information of the terminal device is not received from the terminal device.

The first controller 153 may be configured to determine when the user has left the driver's seat based on detection information detected by the boarding detector when it is determined that the vehicle is parked or stopped, confirm whether the user has sat in the driver's seat again based on detection information detected by the boarding detector when it is determined that an occupant has left the driver's seat, and transmit a provision request signal for the identification information of the terminal device to the terminal device 2 when it is determined that the user has sat in the driver's seat again. In addition, when the first controller 153 receives the identification information of the terminal device from the terminal device 2, the first controller 153 may be configured to determine whether the received identification information of the terminal device is the same as the identification information of the terminal device stored in the first storage and perform authentication on the terminal device. The vehicle may be prevented from being operated by a person other than a registered user.

The first controller 153 may be configured to initiate provision request signal for the identification information of the terminal device to be transmitted to the terminal device 2 when it is determined that an occupant has sat in the driver's seat and cause information regarding the failed recognition of the terminal device in the vehicle when the identification information of the terminal device is not received from the terminal device. This makes it possible to notify that a person other than the user has boarded the vehicle or to allow the user to recognize an incident of a lost terminal device or the like.

The first controller 153 may be configured to maintain the traveling by the user when it is determined that the identification information of the terminal device stored in the first storage is the same as the received identification information of the terminal device, and lock the P stage and to display the authentication failure information of the terminal device on the display when it is determined that the stored identification information of the terminal device is different from the received identification information of the terminal device. The first controller 153 may be configured to perform pairing with the terminal device upon receiving a restart command and unlock the P stage and traveling by comparing the received identification information of the terminal device with the stored identification information of the terminal device when it is determined that the pairing with the terminal device has been successfully performed.

The first controller 153 may be configured to delete the stored user information upon receiving vehicle return information through the application of the terminal device. The first controller 153 may be configured to transmit information on unauthorized use of the vehicle to the server 3 when it is determined that the received identification information of the terminal device is different from the stored identification information. Additionally, the first controller 153 may be configured to perform terminal device authentication by transmitting a provision request signal for the identification information of the terminal device to the terminal device 2 when the engaging of the brake pedal is disengaged in a parked or stopped state, the accelerator pedal is engaged, or the shift lever is changed from an N stage or P stage to a D stage.

The first controller 153 may be configured to confirm a weight of the driver's seat detected by the boarding detector and store information on the confirmed weight of the driver's seat when first startup within a reservation time is performed. In addition, the vehicle may be configured to transmit a provision request signal for the identification information of the terminal device to the terminal device 2 when it is determined that the user has sat in the driver's seat in a parked or stopped state and it is determined that a weight of the driver's seat detected by the boarding detector again is different from the stored weight of the driver's seat, and prevent transmission of the provision request signal for the identification information of the terminal device when it is determined that the re-detected weight is the same as the stored weight. For example, the stored weight may be a weight with an error.

In other words, the first storage may be configured to store a weight detected when the first startup is performed within the reservation time and store a weight with an error. The first storage 151 may be configured to store user information regarding car sharing and information on an electronic key.

Figure 8:
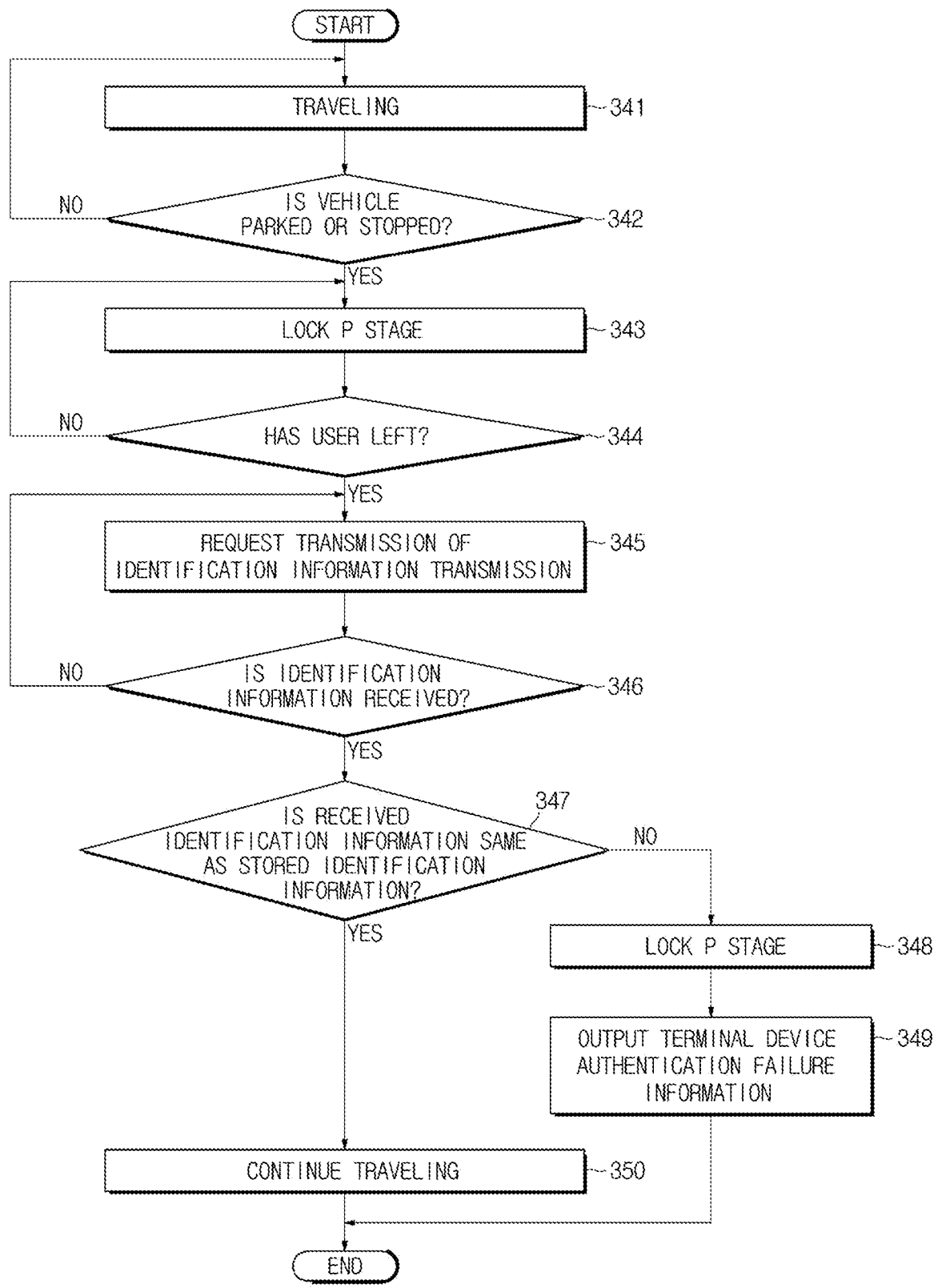
FIG. 8 is an exemplary control flowchart of the vehicle according to yet another exemplary embodiment of the present disclosure.

FIG. 8 is an exemplary control flowchart of the vehicle according to another exemplary embodiment. A vehicle according to the exemplary embodiment may be driven after performing an operation 311 to an operation 320 in FIG. 6A. Subsequently, the vehicle may be configured to determine whether the vehicle is parked or stopped (342) while traveling (341). In particular, the vehicle may be determined to be stopped when a traveling speed detected by the speed detector is 0, and the vehicle may be determined to be parked when it is determined that a shift lever is located at a P stage on the basis of operation information of the shift lever.

The vehicle may be configured to confirm detection information detected by the boarding detector (343) when it is determined that the vehicle is parked or stopped. In particular, the vehicle may be configured to determine whether the user has left the driver's seat based on the detection information detected by the boarding detector (344), determine whether the user sits in the driver's seat again based on the detection information detected by the boarding detector (345) when it is determined that the user has left the driver's seat, and transmit a provision request signal for the identification information of the terminal device to the terminal device 2 when it is determined that the user sits in the driver's seat.

Subsequently, the vehicle may be configured to determine whether the identification information of the terminal device is received from the terminal device 2 (346) and transmit the provision request signal for the identification information of the terminal device to the terminal device 2 again when it is determined that the identification information of the terminal device is not received. The vehicle may be configured to determine whether the received identification information of the terminal device is the same as the stored identification information of the terminal device (347) when it is determined that the identification information of the terminal device is received from the terminal device 2.

The vehicle may be configured to lock the P stage (348) when it is determined that the received identification information of the terminal device is different from the identification information of the terminal device stored in the first storage and display authentication failure information of the terminal device on the first display (349). In addition, the vehicle may be configured to display absence information of the terminal device on the first display when identification information is not received from the terminal device.

The vehicle may continue traveling (350) when it is determined that the received identification information of the terminal device is the same as the identification information of the terminal device stored in the first storage. Moreover, the vehicle may confirm a time when it is determined that the vehicle is parked or stopped and perform terminal device authentication by transmitting a provision request signal for the identification information of the terminal device to the terminal device 2 when it is determined that a predetermined time has elapsed from the confirmed time.

The vehicle may be configured to perform terminal device authentication by transmitting a provision request signal of the identification information of the terminal device to the terminal device 2 at predetermined intervals when it is determined that the vehicle is parked or stopped. The disclosed exemplary embodiments may be realized in the form of a recording medium storing commands executable by a computer. The commands may be stored in the form of a program code and may generate a program module when executed by a processor to perform the operations of the disclosed embodiments. The recording medium may be realized as a computer-readable recording medium.

The computer-readable recording medium includes all types of recording media in which commands which can be decoded by a computer are stored. Examples of the computer-readable recording medium may include a ROM, a RAM, a magnetic tape, a magnetic disk, a flash memory, an optical data storage device, and the like. The embodiments disclosed with reference to the accompanying drawings have been described above. It will be understood by those of ordinary skill in the art to which the present disclosure pertains that the present disclosure may be carried out in the disclosed embodiments and other embodiments without changing the technical ideas and essential features of the present disclosure. The disclosed embodiments are illustrative and should not be construed as limiting.

According to the present disclosure, user authentication may be more easily performed by periodically automatically comparing identification information of a terminal device of a user with user information for car sharing, and unauthorized use and theft of a vehicle by another user can be prevented based on the user authentication. According to the present disclosure, responsibility dispute and controversy for car accidents may be prevented in advance by preventing unauthorized use. Vehicle operation by minors may be regulated and unlicensed drivers and hit-and-run accidents may be reduced. Additionally, according to the present disclosure, personal information leakage may be prevented by deleting previously stored user information when startup of a vehicle is performed or return of the vehicle is confirmed. As described above, according to the present disclosure, by enhancing user authentication, safety of car sharing may be improved, usage of car sharing may be improved, and users' satisfaction with car sharing may be improved.

Although exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A vehicle, comprising:
   a storage configured to store registered user information;
   a communicator configured to communicate with a terminal device; and
   a controller configured to receive identification information of the terminal device from the terminal device when startup is performed, unlock a P stage of a transmission when it determined that the received identification information of the terminal device is the same as an identification number of the terminal device in the stored user information, lock P stage of the transmission when it is determined that the received identification information of the terminal device is different from the identification number of the terminal device in the stored user information, and operate a display to output authentication failure information of the terminal device.

2. The vehicle according to claim 1, wherein the controller is configured to perform pairing with the terminal device when the startup is performed.

3. The vehicle according to claim 1, wherein the communicator is configured to receive user information registered in an application for car sharing from the terminal device.

4. The vehicle according to claim 1, wherein the identification information of the terminal device includes a Wi-Fi media access control (MAC) address of the terminal device.

5. The vehicle according to claim 1, wherein the controller is configured to transmit a provision request signal for the identification information of the terminal device to the terminal device at predetermined intervals when it is determined that the received identification information of the terminal device is the same as the identification number of the terminal device in the stored user information.

6. The vehicle according to claim 1, wherein:
the communicator is configured to receive information regarding a current position; and
the controller is configured to determine the type of surface that the vehicle is traveling is an expressway on based on the received information on the current position when it is determined that the received identification information of the terminal device is different from the identification number of the terminal device in the stored user information and configured to decrease a traveling speed when it is determined that the surface that the vehicle is traveling is not an expressway.

7. The vehicle according to claim 6, wherein the controller is configured to decrease the traveling speed when it is determined that the road on which the vehicle is traveling is not an expressway and configured to stop the vehicle when a predetermined time has elapsed.

8. The vehicle according to claim 6, wherein the controller is configured to operate an emergency light when it is determined that the road on which the vehicle is traveling is not an expressway.

9. The vehicle according to claim 6, wherein the controller is configured to output the authentication failure information of the terminal device when it is determined that the road on which the vehicle is traveling is an expressway.

10. The vehicle according to claim 1, wherein the controller is configured to perform pairing with the terminal device upon receiving a restart command after shutoff is performed and transmit a provision request signal for the identification information of the terminal device to the terminal device when it is determined that the pairing with the terminal device has been successfully performed.

11. The vehicle according to claim 1, wherein the controller is configured to delete the user information stored in the storage upon receiving return information through the communicator.

12. The vehicle according to claim 1, wherein the controller is configured to delete other user information stored in the storage upon receiving new user information through the communicator.

13. The vehicle according to claim 1, wherein the controller is configured to confirm whether an unlocking signal is received from the communicator when it is determined that the received identification information of the terminal device is different from the identification information of the terminal device in the stored user information and release the P stage locking of the transmission when it is determined that the unlocking signal is received from the communicator.

14. A terminal device, comprising:
a communicator configured to communicate with a vehicle;
a storage configured to store an application for car sharing and identification information;
an input configured to receive an execution command of the application;
a controller configured to perform execution of the application upon receiving the execution command of the application, transmit user information registered in the application to the vehicle, and execute transmission of the identification information; and
a display configured to display execution information of the application,
wherein the controller is configured to perform pairing with the vehicle upon receiving a pairing request signal through the communicator and transmit the identification information to the vehicle at predetermined intervals when it is determined that the pairing with the vehicle has been successfully performed.

15. The terminal device according to claim 14, wherein the input is configured to receive a transmission command for identification information stored in the storage.

16. The terminal device according to claim 14, wherein the controller is configured to execute a transmission of the identification information stored in the storage upon receiving a provision request signal for the identification information through the communicator.

17. The terminal device according to claim 14, wherein:
the input is configured to receive user information for registering a user in the application for car sharing; and
the controller is configured to request the application to register the user based on the user information received by the input.

18. The terminal device according to claim 17, wherein the input is configured to receive an information transmission command for an electronic key, and the controller is configured to transmit the user information registered in the application to the vehicle when the startup of the vehicle is performed.

19. A method for controlling a vehicle communicating with a terminal device, comprising:
receiving, by a controller, identification information of the terminal device from the terminal device when startup is performed;
unlocking, by the controller, a P stage of a transmission when it is determined that the received identification information of the terminal device is the same as an identification number of the terminal device in stored user information; and
locking, by the controller, the P stage of the transmission, and outputting, by the controller, authentication failure information of the terminal device when it is determined that the received identification information of the terminal device is different from the identification number of the terminal device in the stored user information.

20. The method for controlling the vehicle according to claim 19, further comprising:
performing, by the controller pairing with the terminal device when the startup is performed;
receiving, by the controller, user information registered in an application for car sharing from the terminal device when it is determined that the pairing has been completed; and
storing, by the controller, the received user information.

21. The method for controlling the vehicle according to claim 19, further comprising:
transmitting, by the controller, a provision request signal for the identification information of the terminal device to the terminal device at predetermined intervals when it is determined that the received identification information of the terminal device is the same as the identification number of the terminal device in the stored user information,
wherein the identification information of the terminal device includes a Wi-Fi MAC address of the terminal device.

22. The method for controlling the vehicle according to claim 19, further comprising:
- confirming, by the controller, a current position of the vehicle when it is determined that the received identification information of the terminal device is different from the identification number of the terminal device in the stored user information;
- determining, by the controller, whether a road on which the vehicle is traveling is an expressway based on the confirmed current position;
- outputting, by the controller, authentication failure information for the terminal device when it is determined that the road on which the vehicle is traveling is an expressway; and
- decreasing, by the controller, a traveling speed when it is determined that the road on which the vehicle is traveling is not an expressway; and
- stopping, by the controller, the vehicle when a predetermined time has elapsed after the reducing of the traveling speed.

23. The method for controlling the vehicle according to claim 19, further comprising:
- determining, by the controller, whether shutoff is performed and a restart command is received; and
- performing, by the controller, pairing with the terminal device upon receiving the restart command and transmitting a provision request signal for the identification information of the terminal device to the terminal device when it is determined that the pairing with the terminal device has been performed.

* * * * *